(12) United States Patent
Janik (10) Patent No.: US 6,863,811 B2
(45) Date of Patent: Mar. 8, 2005

(54) FILTER CARTRIDGE INCORPORATING A PERIPHERAL COMPATIBILITY MATRIX

(75) Inventor: Leon P. Janik, Suffield, CT (US)

(73) Assignee: Stanadyne Corporation, Windsor, CT (US)

( * ) Notice: Subject to any disclaimer, the term of this patent is extended or adjusted under 35 U.S.C. 154(b) by 61 days.

(21) Appl. No.: 10/284,694

(22) Filed: Oct. 31, 2002

(65) Prior Publication Data

US 2004/0084363 A1 May 6, 2004

(51) Int. Cl.[7] .............................................. B01D 27/08
(52) U.S. Cl. ............... 210/232; 210/443; 210/DIG. 17; 29/509; 29/902
(58) Field of Search ................................ 210/232, 440, 210/443, 444, DIG. 17; 29/509, 902

(56) References Cited

U.S. PATENT DOCUMENTS

| | | | | |
|---|---|---|---|---|
| 3,225,929 A | * | 12/1965 | Sicard | 210/232 |
| 5,035,797 A | | 7/1991 | Janik | 210/232 |
| 5,186,829 A | * | 2/1993 | Janik | 210/232 |
| 5,203,994 A | * | 4/1993 | Janik | 210/232 |
| 5,766,463 A | | 6/1998 | Janik et al. | 210/232 |
| 5,837,137 A | | 11/1998 | Janik | 210/232 |
| 6,187,188 B1 | | 2/2001 | Janik et al. | 210/232 |

* cited by examiner

Primary Examiner—Matthew O. Savage
(74) Attorney, Agent, or Firm—Alix, Yale & Ristas, LLP (57) ABSTRACT

A filter assembly employs inward and outward radially displaced portions of a peripheral shoulder on the cartridge as components of a cartridge compatibility matrix. Alternative base assemblies include mounting structures complementary to the configuration of the peripheral shoulder to exclude incompatible cartridges. The peripheral shoulder is preferably a roll seam connecting first and second sections of the filter housing. The invention further contemplates a pattern of radial protrusions from a portion of the cartridge housing received in a base receptacle as part of a cartridge compatibility matrix. The base receptacle is configured to receive only those cartridges having a compatible pattern of radial protrusions. A cartridge compatibility matrix including both inward and outward deformations of a cartridge peripheral shoulder and radial protrusions of the received portion of the cartridge housing can ensure both cartridge compatibility and a particular mounted position of the cartridge relative to the base.

27 Claims, 10 Drawing Sheets

FILTER CARTRIDGE INCORPORATING A PERIPHERAL COMPATIBILITY MATRIX

BACKGROUND OF THE INVENTION

1. Field of the Invention

This invention relates generally to fuel filters employed in connection with internal combustion engines. More particularly, the present invention relates to replaceable fuel filter cartridges for removing foreign particles and/or separating water from the fuel supply system of an internal combustion engine.

2. Description of the Related Art

Fuel filter systems to which the invention relates commonly employ a disposable filter cartridge that is replaced at pre-established intervals of filter usage. The replaceable cartridge is conventionally secured to a base that defines inlet and outlet connections between the cartridge and the fuel supply system. Numerous retention systems have been employed for securing the filter cartridge to the base and allowing removal of the cartridge for replacement purposes.

In practice, filter cartridge requirements may vary depending upon: the type and make of the internal combustion engine; the specific application for which the engine is employed; the climate in which the engine is operated; and/or regional characteristics as to the quality of the fuel supply. Filter cartridges suitable for replacement in a particular filtration system, commonly vary as to capacity, fluid compatibility and filter media qualities.

One of the recurring problems in assuring filtration system performance is encountered in connection with replacement of the filter cartridge. It is imperative that the replacement cartridge be compatible with the filtering requirements for the fuel system. It is common for filter cartridges to have a generally similar exterior configuration regardless of performance. As a result, a replacement filter cartridge may dimensionally conform to the base of a given fuel filter assembly, and not comply with the applicable specifications for the fuel system and thereby jeopardize the integrity of the fuel filtering system. Replacement with an incompatible filter cartridge can have very serious consequences for the operation of the internal combustion engine and may also be unnecessarily more expensive than less costly cartridges which are fully suitable. In practice, replacement cartridges may be so similar in overall configuration that the owner of the vehicle and/or the maintenance technician servicing the internal combustion engine may unknowingly jeopardize the integrity of the filtering system by replacement with a wholly unsuitable cartridge even though the unsuitable cartridge at least cursorily appears to be suitable. There are also, of course, instances where inferior or improper replacement filter cartridges are intentionally installed without the knowledge of the owner of the operator of the vehicle.

For many applications, it is also desirable that a cartridge be mounted to the base at a specific angular orientation so that warnings, directions and markings affixed to the cartridge may be properly positioned to ensure visibility and maximize the chances of successful information dissemination. For other applications, it is desirable that the cartridge be locked in position relative to the base such that the cartridge may not rotate with relation to the base.

U.S. Pat. No. 5,035,797, which is assigned to the assignee of the present invention, discloses a fuel filter assembly in which a base mounts to the vehicle and a disposable filter cartridge is suspended from the base. The cartridge is retained to the base by a threaded collar that engages against a protruding roll seam structure at the periphery of the cartridge housing. The cartridge is replaced by loosening the threaded collar and dismounting the filter cartridge. A key system is disclosed in which keys axially project from the base through corresponding slots in the end cap of the filter cartridge housing. The dimensions and location of the axially projecting keys ensure compatibility by interfering with mounting and sealing of incompatible cartridges lacking the correct slot configuration. The keys interlock with the slots to mount the cartridge at a fixed angular relationship to the base.

U.S. Pat. No. 5,837,137, which is assigned to the assignee of the present invention, discloses a similarly configured fuel filtration assembly (e.g., the cartridge is retained to the base by a threaded collar) incorporating an alternative location and key system. Protrusions from a receiving surface of the base are received in corresponding dimples in the opposing end surface of the cartridge to lock the cartridge at a fixed angular position relative to the base. The protrusions interfere with the mounting and sealing of a non-compatible cartridge having an incompatible pattern of dimples.

A further variation on ensuring compatibility in fuel filtration assemblies similar to those described above is disclosed in U.S. Pat. No. 5,766,463, which is assigned to the assignee of the present invention. The disclosed fuel filter cartridge is formed from a pair of shell sections joined along a roll seam to form the retaining shoulder. The generally cylindrical upper portion of the filter cartridge is received within the base. A plurality of arcuate protrusions radially project from the cylindrical upper portion of the cartridge to be received in compatible tracks in the base. The protrusions are disclosed as part of a key code system including the key/slot system described in the '797 patent. A keying system that relies on protrusions from the received portion of the cartridge housing may permit defeat of the keying system by allowing a cartridge without the protrusions to be received in the keyed base without interference.

An alternative filter cartridge mounting system is disclosed in U.S. Pat. No. 6,187,188, also assigned to the assignee of the present invention. The roll seam at the junction of the cartridge housing sections is radially outwardly displaced to form a plurality of retention tabs. The base includes a fixed retaining structure comprising a retaining lip defining a plurality of axial slots in communication with retaining channel portions above the retaining lip. The axial slots are located and dimensioned to be complementary to the retaining tabs of the filter cartridge. The filter cartridge is retained to the base by axially aligning the tabs with the slots and upwardly displacing the cartridge into the receptacle of the base. The cartridge is then rotated so that the tabs are engaged within the retaining channel portions. The '188 patent discloses that compatibility of the cartridge with the base may be ensured by providing the received portion of the cartridge with arcuate slots to accommodate keys axially projecting from the base as disclosed in the '797 patent. Alternatively, the received portion of the cartridge may be provided with radial protrusions such as those disclosed in the '463 patent. Tracks in the base for receiving the protrusions must be L-shaped (have an axial portion and a radial portion) to accommodate rotation of the cartridge relative to the base.

Ensuring filter cartridge compatibility is an issue of continuing concern in the art. While the approaches to ensuring filter cartridge compatibility described in the '797, '137, '463, and '188 patents represent significant advances over the prior art, further improvements in effectiveness and efficiency are possible. For example, keys projecting from the base that require openings in the filter cartridge compromise the sealed integrity of the filtration system. Keying arrangements that restrict the cartridge to a fixed angular position relative to the base are incompatible with filter assemblies that require rotation of the cartridge relative to the base. The L-shaped tracks disclosed in the '188 patent may be difficult to produce, thereby increasing the cost of filter assemblies.

There is an ongoing need in the art for a filter assembly that prevents installation of incompatible filter cartridges. Ideally, a filter cartridge compatible with such a key system may be employed with a filter assembly in which the cartridge is retained to the base by a collar and filter assemblies in which the cartridge is rotated to engage radially projecting tabs in a retainer fixedly extending from the base.

SUMMARY OF THE INVENTION

A first aspect of the present invention pertains to inward and outward displacement of a roll seam at the junction of housing sections of a filter cartridge to provide components of a cartridge compatibility matrix. Portions of the roll seam are radially outwardly offset to form retention tabs. Further portions of the roll seam are radially inwardly displaced relative to the remainder of the roll seam. In one embodiment, the cartridge housing is substantially symmetric about a central axis, and the retention tabs are equiangularly spaced about the axis. The tabs are also substantially equivalent in angular extent and radial displacement, i.e., the tabs have the same general configuration. Consequently, the roll seam includes three substantially equal length portions extending between the retention tabs. One or more of these roll seam portions may include a segment that is inwardly displaced with respect to the central axis. The receptacle of a compatible base is provided with structures permitting reception and sealing of a cartridge with a complementary pattern of retention tabs and inward displaced segments. A non-compatible cartridge, for example a cartridge with a similar arrangement of retention tabs but lacking the requisite inwardly displaced segments of the roll seam, is prevented from mating with the base.

In a base with a fixed retainer where the retention tabs are axially received through slots and the cartridge secured to the base by rotation relative to the base, compatibility is ensured by inward protrusions on the retainer lip. The inward protrusions of the retaining lip correspond to the inwardly displaced segments of the roll seam and allow axial reception of the roll seam through the retaining lip. The roll seam of an incompatible filter cartridge will lack the correct arrangement of inwardly displaced portions of the roll seam will be prevented from axial reception into the base. In one cartridge compatibility matrix, the roll seam includes three equiangularly spaced retention tabs and three equiangularly spaced inwardly displaced segments of the roll seam. Alternatively, the inwardly displaced portions may be non-symmetrical to ensure a particular installed orientation of the cartridge relative to the base.

In addition, the filter cartridge may also comprise at least one outward protrusion from the side wall of that portion of the cartridge received in the base. Rather than an L shaped track in the base receptacle, a ring at the entrance to the receptacle defines axial openings compatible with the protrusions on the cartridge. Together, the configuration of the roll seam and the received portion of the cartridge may be incorporated into multiple levels of keying for cartridge identification, cartridge positioning and quality control purposes.

Another aspect of the present invention relates to a filter assembly where a cartridge of the present invention is retained to a base by a collar. An annular lip of the base axially protrudes into a space defined between the roll seam and the received portion of the filter cartridge. The configuration of this space is complementary with the configuration of the roll seam, e.g., the retention tabs increase the radial dimension of the space and the inwardly displaced segments of the roll seam decrease the radial dimension of the space. The axially protruding lip of the base is provided with outward protrusions complementary with the retention tabs and locations where lip material is removed to accommodate inwardly displaced segments of the roll seam.

An object of the present invention is to provide a new and improved filter cartridge compatibility matrix.

Another object of the present invention is to provide a new and improved filter cartridge structure that ensures compatibility in filter assemblies having fixed and movable cartridge-retention systems.

A further object of the present invention is to provide a new and improved filter assembly in which compatibility protection cannot be defeated by omission of the compatibility matrix structure from the cartridge.

Other objects and advantages of the invention will become apparent from the drawings and the specification.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENTS

Preferred embodiments of a filter cartridge illustrating several aspects of the present invention will now be described with particular reference to FIGS. 1–5. A first embodiment of a filter base component compatible with the cartridge of FIGS. 1–5 is shown in FIGS. 6–11. A second embodiment of a filter base component compatible with the cartridge of FIGS. 1–5 is shown in FIGS. 12–15.

Figure 1:
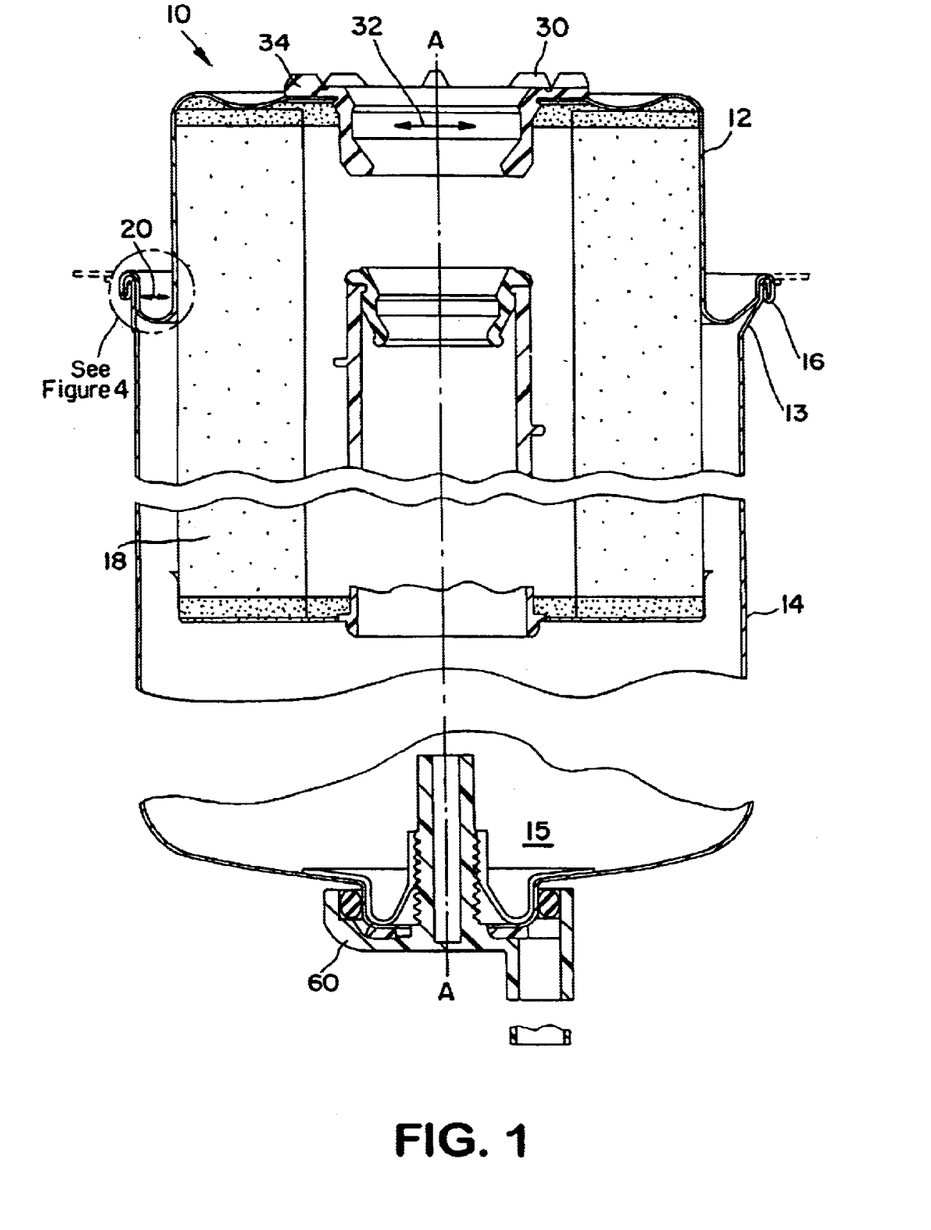
FIG. 1 is a vertical sectional view, partly broken away, of a fuel filter cartridge incorporating a compatibility matrix exemplary of several aspects of the present invention.
Figure 4:
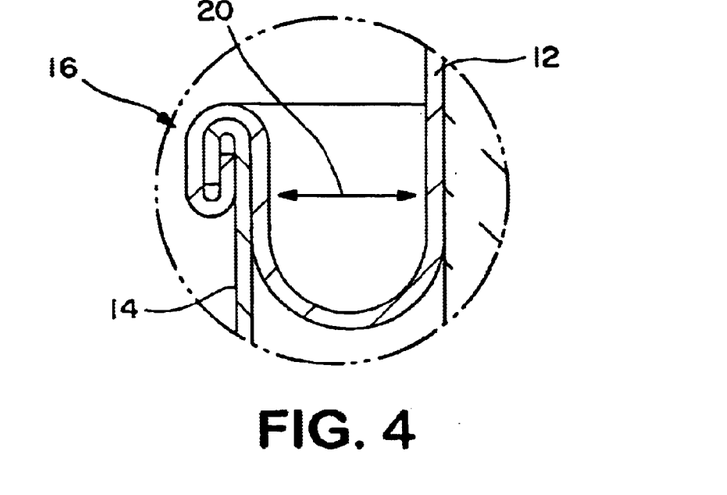
FIG. 4 is an enlarged sectional view through the roll seam at the left side of the filter cartridge of FIG. 1.

FIG. 1 is a sectional view through an exemplary filter cartridge 10 comprising a first housing section 12 joined to a second housing section 14 along a peripheral roll seam 16. FIG. 4 illustrates an enlarged sectional view through the roll seam 16 on the left hand side of FIG. 1. The sheet metal of the respective housing sections which forms the roll seam is shown as dotted lines to the left and right of the filter cartridge 10 adjacent the roll seam in FIG. 1. The sheet metal extending from the housing first section 12 extends radially beyond the sheet metal of extending from the housing second section 14. When rolled together to form the roll seam shown in FIG. 4, the extended radial length of the sheet metal of the housing first section 12 is rolled under and overlaps the sheet metal of the housing second section 14. The rolled, overlapping sheet metal is then crimped to form the roll seam in a manner known in the art. A U-shaped bend in the housing first section 12 inwardly of the roll seam defines a space 20 between the roll seam and the housing first section 12. This space 20 allows access to the interior of the roll seam 16 during seam formation and for the purposes of deformation as will be discussed below.

The filter cartridge 10 has an overall general configuration and functionality that is well understood by those of skill in the art. A filter element 18 is supported within the filter cartridge. A grommet 30 surrounds an axial opening 32 in the housing first section 12 that receives coaxial conduits (not shown) for delivery of unfiltered fluid and retrieval of filtered fluid from the filter cartridge 10. The housing second section 14 may be provided with a drain cock 60 for removal of water that may accumulate in a sump 15 defined by the lower portion of the housing second section 14.

Figure 2:
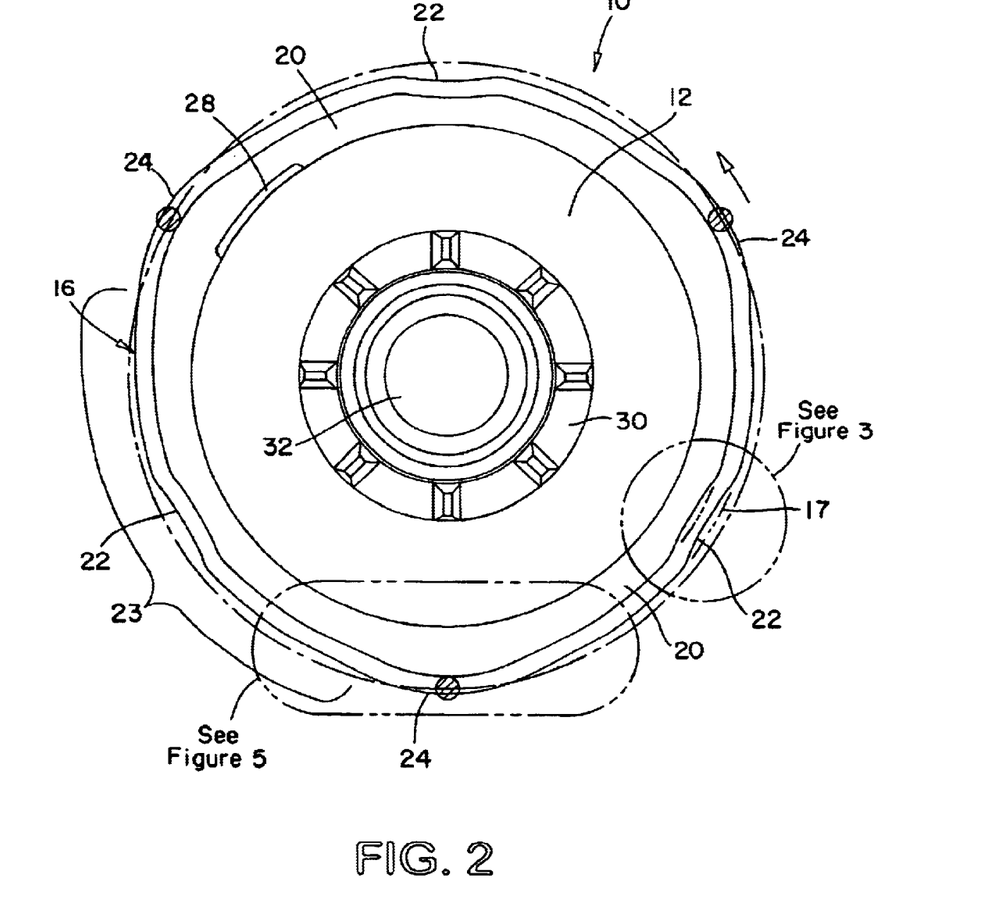
FIG. 2 is a top plan view of the filter cartridge of FIG. 1.

FIG. 2 is a top view of the filter cartridge of FIG. 1. The roll seam 16 circumscribes the filter cartridge 10 radially separated from the housing first section 12 to define an annular space 20. The roll seam 16 includes three portions that are radially outwardly displaced relative to the central axis A of the cartridge to form retention tabs 24. The retention tabs 24 are illustrated as being equiangularly arranged on the circumference of the roll seam and of equal angular extent and radial displacement. Three roll seam portions 23 extend between the retention tabs 24. In the illustrated embodiment, each of these portions 23 of the roll seam include a radially inwardly displaced segment 22. The inwardly displaced segments 22 provide one variable for use in conjunction with a cartridge compatibility matrix. The inwardly displaced segments 22 of the roll seam 16 on the exemplary filter cartridge 10 are diametrically opposed to each retention tab 24.

The inward and outward displacement of the roll seam relative to its generally circular shape result in a serpentine configuration. This complex shape is advantageously located at the radial outer periphery of the filter cartridge. As will be discussed in greater detail below, a compatibility matrix including a serpentine, or convoluted outer periphery of the filter cartridge presents unique opportunities for blocking reception of cartridges omitting portions of the compatibility matrix. Further, inward and outward displacement of the roll seam 16 relative to the central axis A of the cartridge defines an annular space 20 having a variable radial dimension when measured perpendicular to the cartridge axis A, as best seen in FIG. 2. The shape of the annular space 20 may be used as part of a cartridge compatibility matrix when the cartridge 10 is mounted to a base including the component shown in FIGS. 12 and 13 by the collar shown in FIGS. 14 and 15. In accordance with a further aspect of the present invention, the outer profile of the roll seam 16 is used as a constituent of a cartridge compatibility matrix when the cartridge 10 is mounted to a base including the component shown in FIGS. 6–11.

Figure 3:
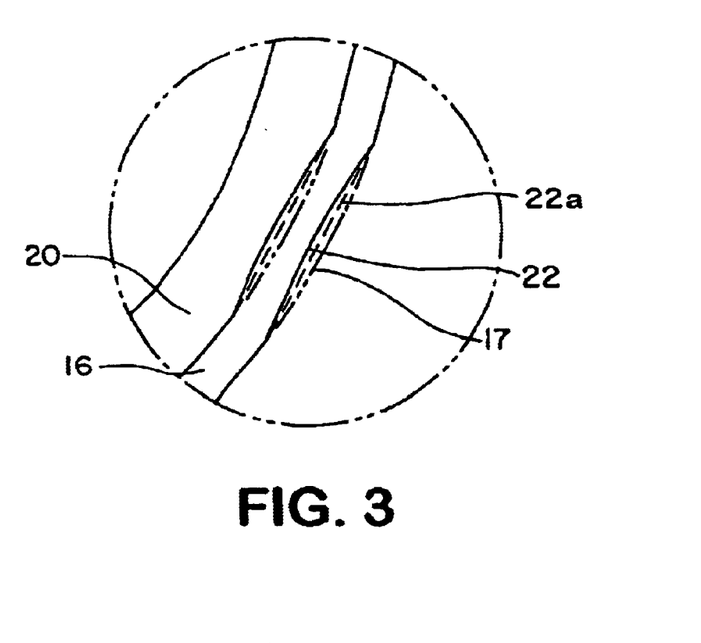
FIG. 3 is an enlarged view of an inwardly displaced segment of the roll seam of the filter cartridge of FIG. 2.

FIG. 3 illustrates an enlarged view of an inwardly displaced segment 22 of the roll seam 16. In the illustrated embodiment, the inward displacement of the roll seam is in the form of an arc having a radius of curvature of approximately 2.5" and a center of curvature located outside the roll seam 16. The inward deformation displaces the roll seam 16 inwardly from its normal radius of curvature 17 (illustrated by the dashed line in FIG. 3) by a distance in the range of 0.02" to 0.05" at the center of the deformation. The inwardly displaced segment has a length of approximately 0.5" measured along the circumference of the roll seam. Alternatively, the inwardly displaced segment may be configured as a substantially linear portion 22a of said shoulder 16.

Figure 5:
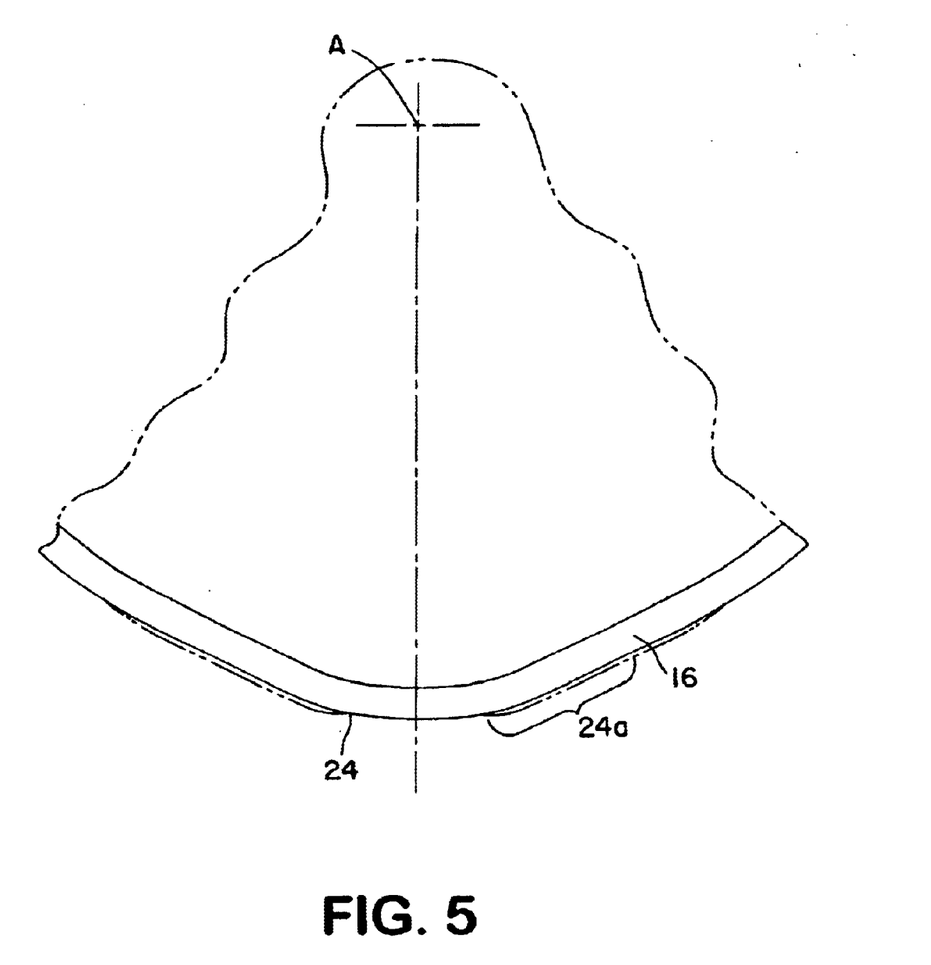
FIG. 5 is an enlarged portion of the filter cartridge shown in FIG. 2 illustrating a retention tab formed from an outward deformation of the roll seam.
Figure 6:
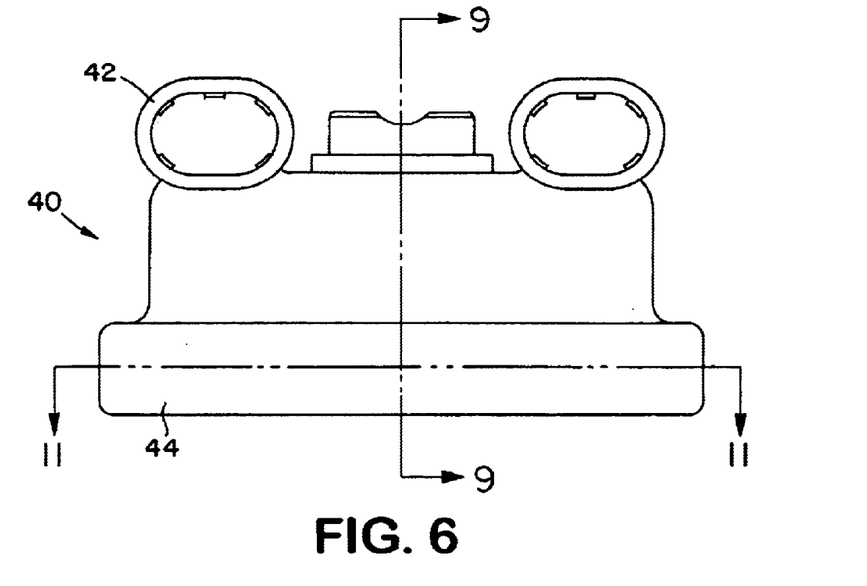
FIG. 6 is a front view of a portion of a first filter base component configured to receive the filter cartridge of FIG. 1.
Figure 7:
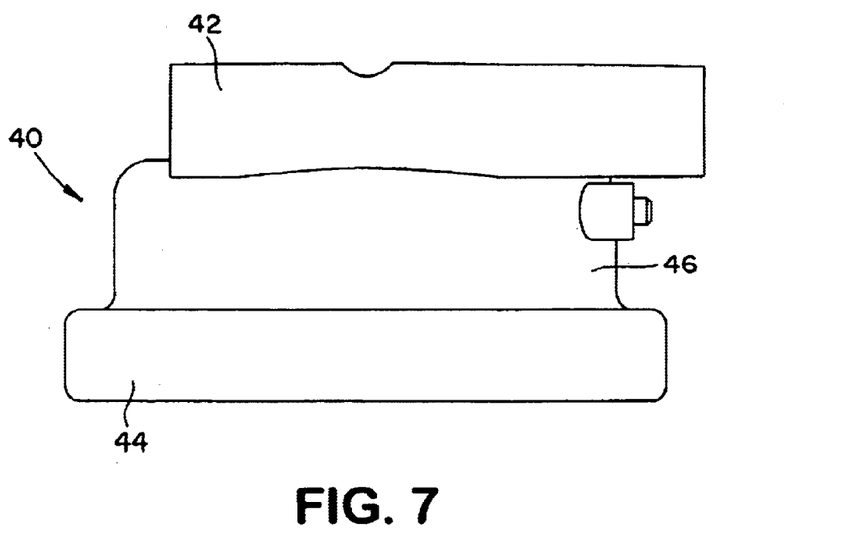
FIG. 7 is a side view of the filter base component of FIG. 6.
Figure 8:
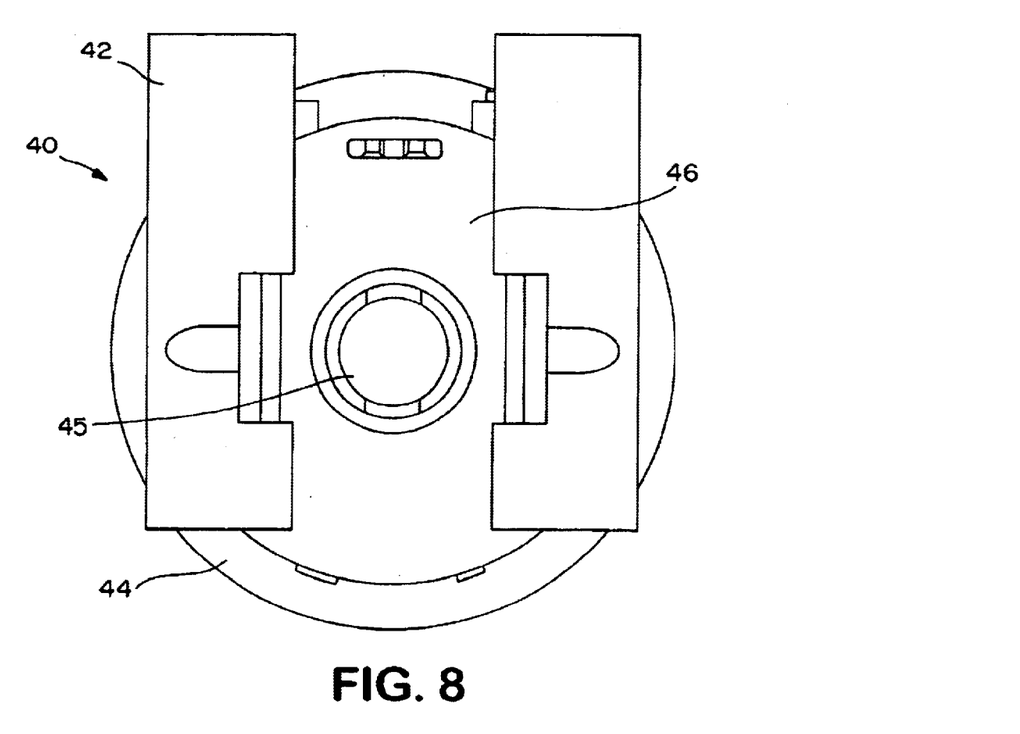
FIG. 8 is a top view of the filter base component of FIG. 6.
Figure 9:
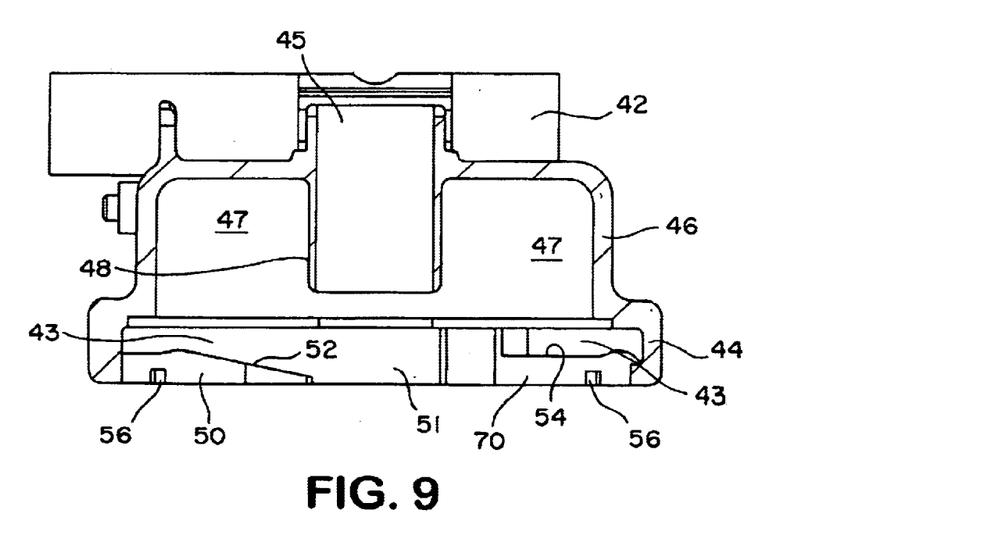
FIG. 9 is a sectional view of the filter base component of FIG. 6, taken along line 9—9 thereof.
Figure 10:
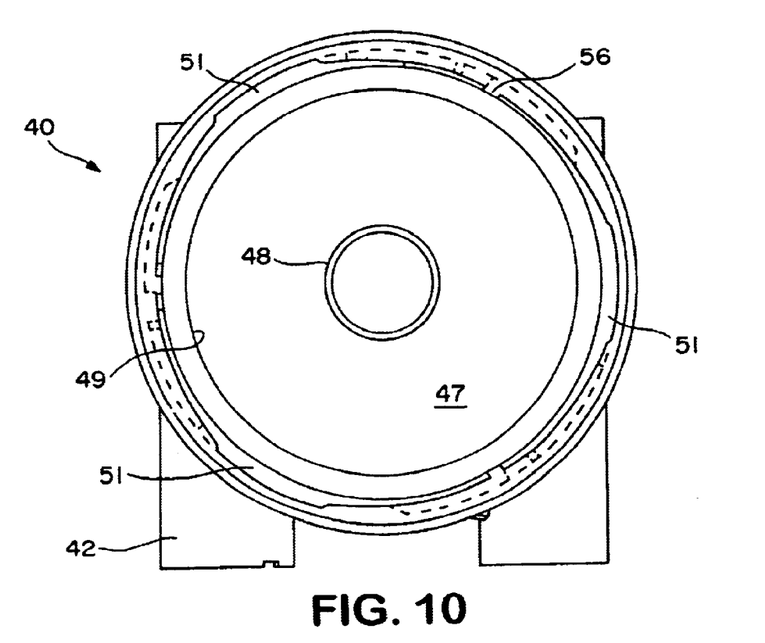
FIG. 10 is a bottom view, partly in phantom, of the filter base component of FIG. 6.
Figure 11:
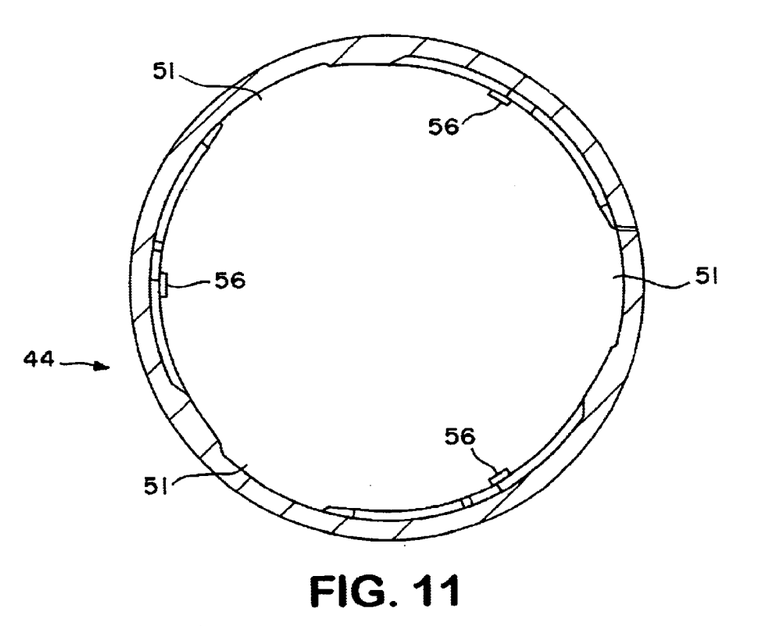
FIG. 11 is a sectional view of the filter base component of FIG. 6, taken along line 11—11 thereof.

FIG. 5 is an enlarged portion of FIG. 2 illustrating the outward displacement of the roll seam 16 to form a retention tab 24. The roll seam is radially outwardly displaced by a distance of approximately 0.08" relative to adjacent portions of the roll seam or a distance approximately equivalent to the radial thickness of the roll seam 16. Each retention tab 24 of the illustrated embodiment maintains its maximum outward displacement (of approximately one roll seam thickness) for approximately 0.5". It will be appreciated that the roll seam 16 includes transitional portions 24a adjacent either end of the retention tabs. The roll seam 16 between the retention tabs 24 (including their transitional portions 24a) and the inwardly displaced segments 22 maintain a substantially constant radius of curvature centered on the cartridge axis A.

FIGS. 6–11 illustrate one component of a first embodiment of a filter base configured to mount the filter illustrated in FIGS. 1–5. The illustrated component 40 of a filter base is a molded member with integrally extending bracket portions 42. The bracket portions 42 are configured to receive a reinforcing metal sleeve (not shown) through which an attachment bolt (not shown) retains the filter base to a support structure (not shown). Below the bracket portions, the illustrated base component 40 comprises a generally cylindrical wall 46 that defines a receptacle 47 for axially receiving the filter cartridge housing first section 12. An axial central conduit 48 of the base component 40 is received and sealingly engaged by a grommet 30 of an installed filter cartridge 10. The cylindrical wall 46 flares to include a fixed integral retainer 44. The retainer 44 comprises three axial slots 51 complementary to the radially projecting retention tabs 24 on the cartridge 10. The axial slots 51 communicate with retaining channel portions 43 partially defined by a retaining lip upper surface comprising a ramp 52 and a seat 54.

The first housing section 12 of the filter cartridge 10 is axially inserted into the receptacle 47 until the retaining tabs 24 are aligned with the retaining channel portions 43. The cartridge 10 is then rotated clockwise relative to the base. During rotation, the retaining tabs ride up the ramps 52 and over a raised portion of the retaining lip to seats 54 defined by the retaining lip upper surface. A resilient radial extension 34 of the cartridge grommet 30 biases the cartridge 10 away from the base component 40 so that the seated retention tabs 24 resist unintended counterclockwise rotation of the cartridge 10 relative to the base.

In accordance with an aspect of the present invention, the retainer 44 defines lip portions 70 having an inward-facing profile including radially inward projecting protrusions 56 corresponding to the location of each inwardly displaced segment 22 of the roll seam 16 relative to the retention tabs 24 (the location of which correspond to the axial slots 51 separating the retaining lip portions 70). The axial slots 51 and lip portions 70 with protrusions 56 code the base component 40 for a filter cartridge such as cartridge 10 with a roll seam having a compatible pattern of retention tabs 24 and inwardly displaced segments 22. The roll seam 16 of a compatible filter cartridge can pass the retaining lip portions 70, permitting complete axial reception of the cartridge housing first section 12 into the receptacle 47 so that subsequent rotation of the cartridge mounts the cartridge to the base. An incompatible cartridge (lacking, for example, the requisite inwardly displaced segments 22) is blocked from axial reception and cannot be mounted to the coded base.

Figure 12:
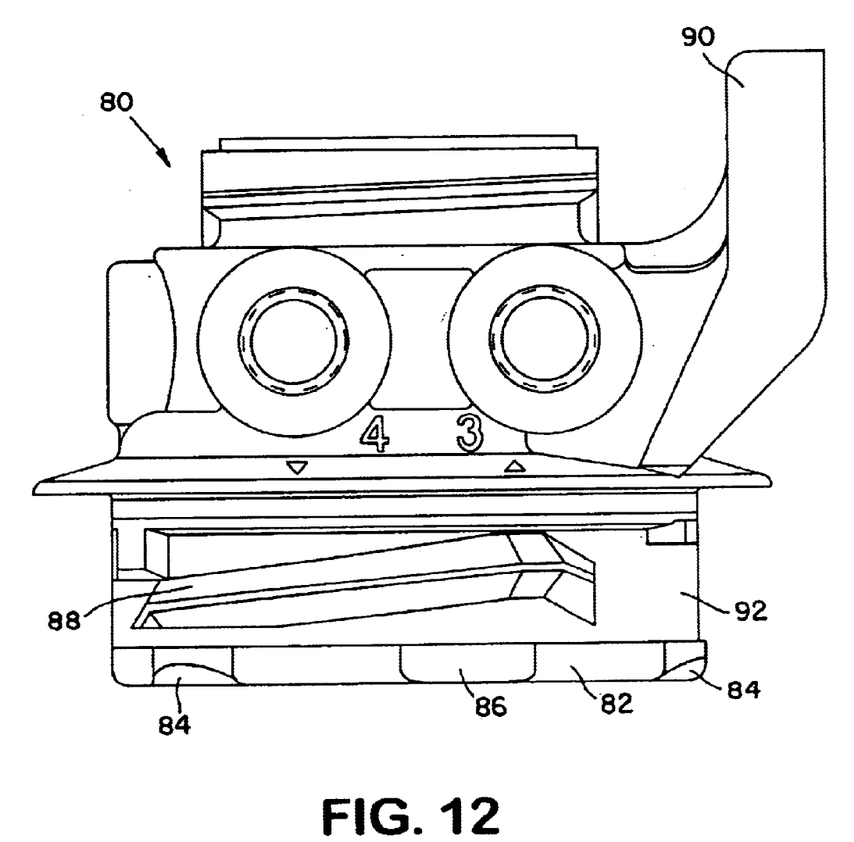
FIG. 12 is a side view of a second filter base component configured to receive the filter cartridge of FIG. 1.
Figure 13:
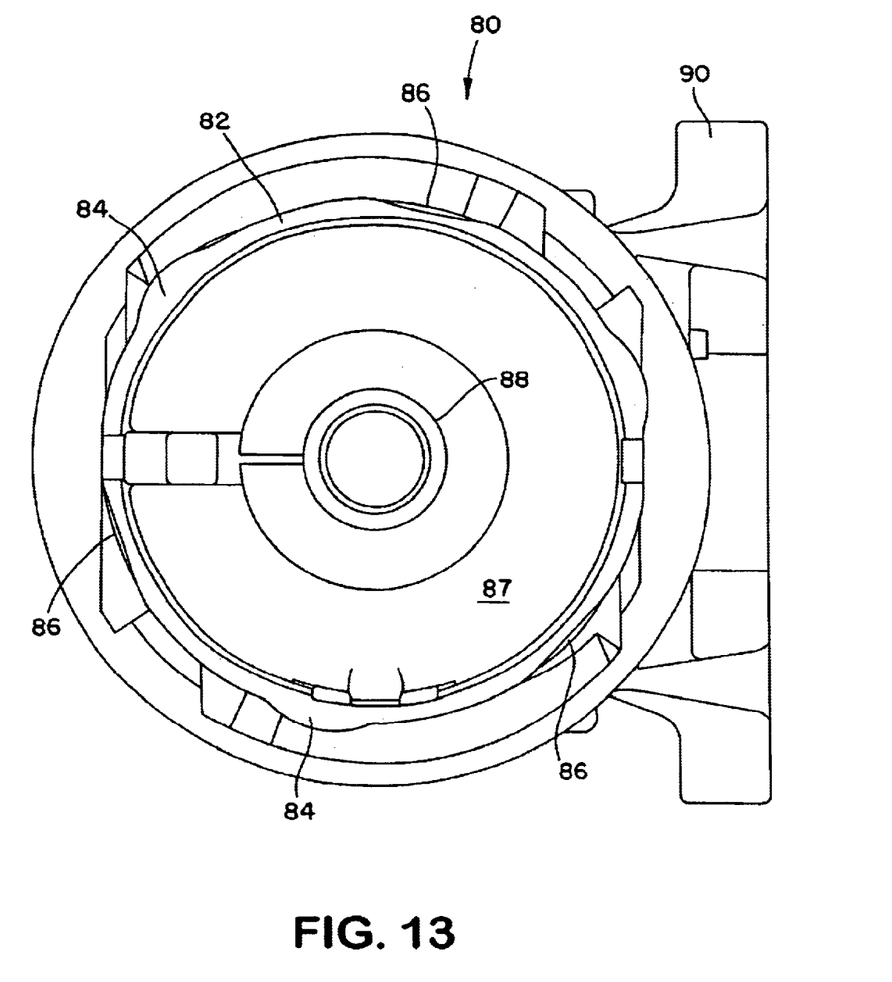
FIG. 13 is a bottom view of the filter base component of FIG. 12.

FIGS. 12 and 13 illustrate a second representative embodiment of a base component 80 configured to receive a cartridge illustrated in FIGS. 1–5. This form of filter base comprises a cast or molded component 80 with a cylindrical wall 92 defining a receptacle 87 into which the housing first section 12 of the cartridge is axially receivable. The cartridge is retained to the base by a collar 100 (illustrated in FIGS. 14 and 15) that engages the peripheral roll seam 16. In accordance with an aspect of the present invention, the lip 82 of the wall 92 is provided with a sectional configuration complementary to the annular space 20 defined between the cartridge housing first section 12 and the roll seam 16. Radial outward projections 84 of the lip correspond to the location and outward radial displacement of the retention tabs 24. The base component 80 may be cast with the lip 82 having locations 86 where the lip is thinned or notched to accommodate inwardly displaced segments 22 of the cartridge roll seam 16. Alternatively, lip material may be removed after production of the base component 80, such as by machining the lip at locations 86.

The collar 100 includes an inward projecting thread 108 configured to engage an outward projecting thread 88 on the base component 80. Rotation of the collar 100 relative to the base component 80 causes the collar thread 108 to ride the base thread 88, bringing the collar retaining lip 102 to bear against the radially projecting roll seam 16 of the cartridge 10. A spring (not shown) in the base receptacle 87 biases the cartridge 10 and collar 100 away from the base component to maintain the collar in a locked position over the end of the base thread 88. This mounting system requires that the axially projecting lip 82 of the base component be received in the annular space 20 with room for axial movement to accommodate compression and release of the spring as the collar thread 108 rides up and over the thread 88 of the base. A rigid abutment of the cartridge roll seam 16 against the lip 82 of the base that prevents the necessary axial movement of the cartridge 10 relative to the base component 80 will prevent complete rotation of the collar 100 to its locked position.

Figure 14:
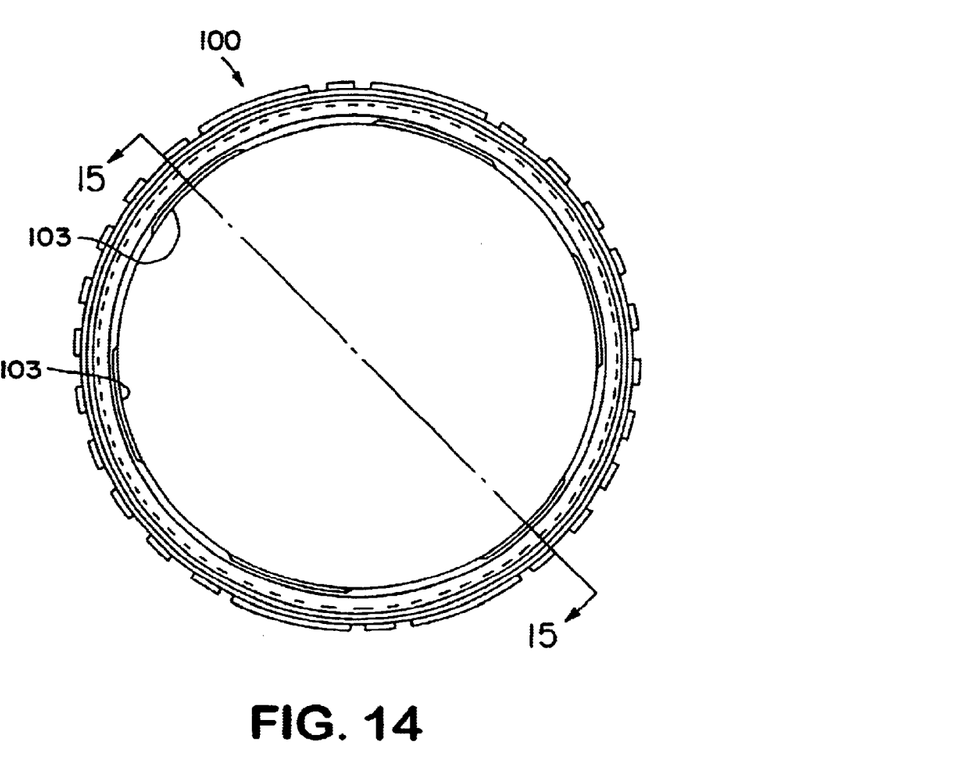
FIG. 14 is bottom view, partly in phantom, of a retaining collar for retaining the filter cartridge of FIG. 1 to the base component of FIGS. 12 and 13.
Figure 15:
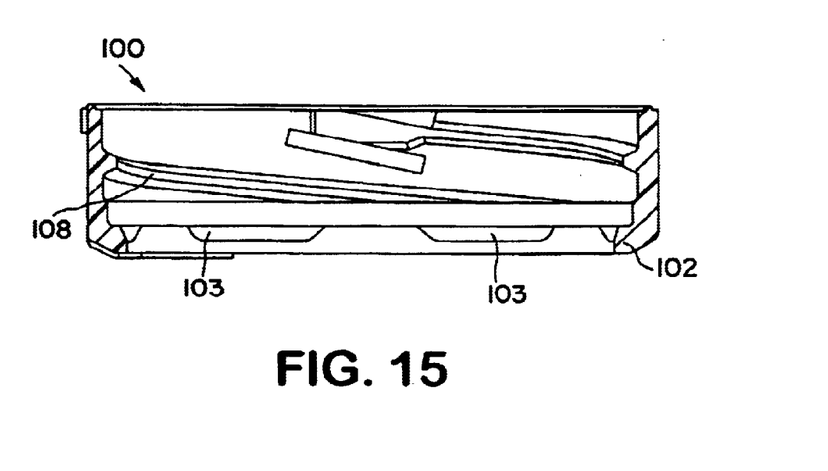
FIG. 15 is a sectional view of the collar of FIG. 14, taken along line 15—15 thereof.

The lip 102 of the collar 100 includes a plurality of locations 103 where the lip and adjacent structure is recessed or lip material is removed to accommodate the shape 13 (an outward deflection best seen in FIG. 1) of the cartridge housing second section 14 adjacent the outward deformation of the roll seam 16 for each retention tab 24. In the illustrated embodiment, the collar is provided with six locations 103 where lip material is removed. The six locations 103 correspond to the six possible engaged positions of the collar 100 relative to the base component 80 and the received filter cartridge 10. The outward deflections of the housing second section fit into three of the six locations, further enhancing the security of the collar 100 in its locked position relative to the cartridge 10 and the base component 80 by resisting unintentional reverse rotation of the collar.

A filter cartridge lacking outward deformations 24 of the roll seam 16 complementary to the outward projections 84 on the axially projecting lip 82 of the base component 80 will be blocked from axial reception and mating with the base. Similarly, filter cartridges including inward deformations of the roll seam will be rejected by a base whose axially projecting lip 82 does not include locations 86 where lip material has been removed to accommodate them. By axial reception and mating with the base, it is meant that the grommet 30 carried by the housing first section 12 fully engages the axial conduit 88 of the base component and the lip 82 of the base is received in the annular space 20 of the cartridge with room to move axially during rotation of the collar 100 to its locked position. Thus, the configuration of the axially projecting lip 82 forms a component of a cartridge compatibility matrix that codes the base for a cartridge having a particular shape of annular space 20 (as defined by deformations 24, 22 of the roll seam).

A further aspect of the present invention contemplates a filter cartridge compatibility matrix comprising the roll seam retention tabs 24 and inward displaced segments 22 as described above and further including radial protrusions 28 of the cartridge housing section first end 12. In the first embodiment of a filter base component 40, a ring (not shown) is keyed to the base component to define an entrance to the receptacle 47. The ring includes openings that allow axial passage of the radial protrusions 28 of the housing first section 12. Once the radial protrusions 28 are axially past the ring, the receptacle 47 of the base component 40 permits rotation of the cartridge relative to the base. Radial protrusions 28 of the housing first section 12 may be used as an additional component of the cartridge compatibility matrix. The radial protrusions may also be employed to ensure a particular installed orientation of the cartridge 10 relative to the base component 40.

The inside surface of the wall 92 defining the receptacle 87 of the second embodiment of a filter base component 80 may include axial tracks (not shown) complementary to the pattern of radial protrusions from the cartridge housing first section 12. The tracks may be molded and/or machined on the inner surface of the receptacle of the base component 80. A filter cartridge including an incompatible pattern of radial protrusions will be blocked from axial reception into the receptacle 87. In combination, the configuration of the filter cartridge roll seam 16 and received housing first section 12 can be used to ensure filter compatibility and a particular installed configuration of the filter cartridge 10 relative to the base component 80.

While preferred embodiments of the present invention have been set forth for the purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A filter cartridge comprising:
   a filter element arranged around a central axis; and
   a housing for said filter element, said housing comprising first and second sections having respective first and second diameters relative to a central axis, said second diameter being greater than said first diameter, said first section surrounding an axial end of the filter element and defining an axial opening and joined to said second section along a radially projecting shoulder,
   wherein said shoulder has a primarily circular outer profile, said primarily circular outer profile being interrupted by angularly spaced retention tabs projecting radially outwardly relative to said primarily circular outer profile and at least one profile segment having a reduced radial distance from the central axis relative to the primarily circular outer profile.

2. The filter cartridge of claim 1, wherein said shoulder comprises a roll seam formed at the junction of said first and second sections.

3. The filter cartridge of claim 1, wherein said first section comprises an axially extending generally cylindrical wall and said shoulder is radially spaced from said cylindrical wall to define a substantially annular space.

4. The filter cartridge of claim 3, wherein said substantially annular space comprises first, second and third portions having respective first, second and third radial dimensions, said first radial dimension corresponding to a first radial distance between the cylindrical wall and the primarily circular outer profile, said second radial dimension corresponding to a second radial distance between the cylindrical wall and each of the retention tabs and said third radial dimension corresponding to a third radial distance between the cylindrical wall and the profile segments having a reduced radial distance from the central axis relative to the primarily circular outer profile, said first radial distance being less than said second radial distance and greater than said third radial distance.

5. The filter cartridge of claim 1, comprising three retention tabs equiangularly arranged around a circumference of said shoulder.

6. The filter cartridge of claim 1, wherein said at least one profile segment is angularly spaced from said retention tabs.

7. The filter cartridge of claim 1, comprising three retention tabs equiangularly arranged around a circumference of said shoulder and said at least one profile segment comprises three profile segments, each of said three profile segments diametrically opposed to a retention tab.

8. The filter cartridge of claim 1, wherein said at least one profile segment comprises an arc having a center of curvature outside said primarily circular outer profile.

9. The filter cartridge of claim 1, wherein said at least one profile segment comprises a substantially linear portion of said shoulder between two angularly spaced points on said substantially circular profile.

10. A filter cartridge comprising:
    a filter element extending between axially separated first and second ends;
    a housing first section defining a portion of a cylindrical space and supporting the first end of the filter element, said housing first section having a first end defining an axial opening, a generally cylindrical side wall extending from the first end to a second end including a U-shaped bend;
    a housing second section defining a portion of the cylindrical space, said housing second section having a first end joined to the housing first section second end by a roll seam, the second end of the housing second section surrounding the second end of the filter element, wherein said roll seam is radially spaced from the side wall of the housing first section to define a substantially annular space, said annular space comprising portions having first, second and third radial dimensions relative to the side wall, said first dimension being smaller than said second and third dimensions and said second dimension being smaller than said third dimension.

11. The filter cartridge of claim 10, wherein said substantially annular space comprises three retaining tab portions having said third dimension, three inwardly displaced portions having said first dimension angularly spaced from said retaining tab portions and six intermediate portions having said second dimension, said intermediate portions arranged between said retaining tab portions and said inwardly displaced portions.

12. The filter cartridge of claim 11, wherein said retaining tab portions alternate with said inwardly displaced portions.

13. A filter cartridge comprising:
    a filter element;
    a housing for said filter element, said housing comprising first and second sections and a central axis;
    said first section defining an axial opening and joined to said second section along a circumferential roll seam; said roll seam comprising alternating radial inner and outer arcuate segments, said inner segments having substantially equal radii of curvature,
    wherein an arc defined by the roll seam of at least one of said inner segments is interrupted by a portion of said roll seam radially inwardly displaced relative to said radii of curvature.

14. The filter cartridge of claim 13, wherein said portion comprises a substantially linear segment of said roll seam between two angularly offset points on said arc.

15. The filter cartridge of claim 13, wherein said portion comprises a substantially arcuate inward deflection of said roll seam between two angularly offset points on said arc.

16. The filter cartridge of claim 15, wherein said arcuate inward deflection has an axis of curvature outside said circumferential roll seam.

17. The filter cartridge of claim 13, comprising three inner segments and three outer segments.

18. The filter cartridge of claim 17, wherein the three inner segments have equivalent first arcuate extents and said three outer segments have equivalent second arcuate extents, said first arcuate extents subtending a greater angle than said second arcuate extents.

19. The filter cartridge of claim 17, wherein each of said three inner segments is interrupted by a portion of said roll seam radially inwardly displaced relative to the first radii of curvature.

20. The filter cartridge of claim 19, wherein each of said three inner segments is bisected by the portion of said roll seam inwardly displaced relative to the first radii of curvature.

21. A method for manufacturing a filter cartridge comprising the steps of:
    forming a roll seam at the junction of first and second cartridge housing portions, said roll seam having a substantially constant radius of curvature;
    displacing at least a first portion of said roll seam radially outwardly relative to said radius of curvature; and
    displacing at least a second portion of said roll seam radially inwardly relative to said radius of curvature.

22. The method of claim 21, wherein said step of displacing at least a first portion comprises displacing three first portions of said roll seam radially outwardly relative to said radius of curvature.

23. The method of claim 22, wherein said three first portions are equiangularly arranged around an axis of said filter cartridge and have substantially equivalent arcuate extents.

24. The method of claim 23, wherein said step of displacing at least a second portion comprises displacing three second portions of said roll seam radially inwardly relative to said radius of curvature.

25. The method of claim 24, wherein said three second portions are equiangularly arranged around an axis of said filter cartridge and are of substantially equivalent configuration.

26. The method of claim 21, wherein said step of displacing at least a first portion comprises displacing said at least a first portion radially outwardly by a distance of approximately 0.08" relative to a central axis of said cartridge.

27. The method of claim 21, wherein said step of displacing at least a second portion comprises displacing said at least a second portion radially inwardly by a distance in the range of 0.02" to 0.05" relative to a central axis of said cartridge.

* * * * *